(12) United States Patent
Xu

(10) Patent No.: US 9,843,699 B2
(45) Date of Patent: Dec. 12, 2017

(54) COPY SYSTEM, COPY METHOD, READING APPARATUS, AND IMAGE RECORDING APPARATUS FOR IMAGE RECORDING USING PARTICULAR CODE

(71) Applicant: BROTHER KOGYO KABUSHIKI KAISHA, Nagoya-shi, Aichi-ken (JP)

(72) Inventor: Shan Xu, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/084,596

(22) Filed: Mar. 30, 2016

(65) Prior Publication Data

US 2016/0295066 A1 Oct. 6, 2016

(30) Foreign Application Priority Data

Mar. 30, 2015 (JP) ................ 2015-068627

(51) Int. Cl.
  *H04N 1/32* (2006.01)
  *H04N 1/00* (2006.01)
(52) U.S. Cl.
  CPC ..... *H04N 1/32267* (2013.01); *H04N 1/00411* (2013.01); *H04N 1/00803* (2013.01); *H04N 2201/0082* (2013.01)
(58) Field of Classification Search
  None
  See application file for complete search history.

(56) References Cited

U.S. PATENT DOCUMENTS

| | | | |
|---|---|---|---|
| 2007/0019232 A1* | 1/2007 | Kano | H04N 1/00307 358/1.15 |
| 2008/0100877 A1* | 5/2008 | Inoue | H04N 1/00355 358/440 |
| 2010/0053659 A1 | 3/2010 | Hattori | |

(Continued)

FOREIGN PATENT DOCUMENTS

| | | |
|---|---|---|
| JP | 2006-056009 A | 3/2006 |
| JP | 2006-056197 A | 3/2006 |

(Continued)

*Primary Examiner* — Thomas D Lee
(74) *Attorney, Agent, or Firm* — Scully, Scott, Murphy & Presser, P.C.

(57) ABSTRACT

In a copy system includes an image recording apparatus and a reading apparatus. A controller of the image recording apparatus performs: controlling a recording device to record a particular code indicating communication information identifying a communication device of the image recording apparatus; receiving image data; and controlling the recording device to record at least one image based on the received image data. A controller of the reading apparatus performs: controlling a reading device to read at least one document to create image data; and analyzing the created image data and determining whether the created image data contains the particular code on a page-by-page basis. When determining that the created image data contains the particular code. The controller of the reading apparatus performs: obtaining the communication information indicated by the particular code; and transmitting a portion of the created image data to a destination identified by the communication information.

17 Claims, 10 Drawing Sheets

(56) References Cited

U.S. PATENT DOCUMENTS

2014/0240751 A1* 8/2014 Takeishi ................ G06F 3/1234
358/1.14
2015/0373220 A1* 12/2015 Koizumi ............ H04N 1/32144
358/448

FOREIGN PATENT DOCUMENTS

| JP | 2006-067518 A | 3/2006 |
| JP | 2006-080835 A | 3/2006 |
| JP | 2010-062727 A | 3/2010 |

* cited by examiner

COPY SYSTEM, COPY METHOD, READING APPARATUS, AND IMAGE RECORDING APPARATUS FOR IMAGE RECORDING USING PARTICULAR CODE

CROSS REFERENCE TO RELATED APPLICATION

The present application claims priority from Japanese Patent Application No. 2015-068627, which was filed on Mar. 30, 2015, the disclosure of which is herein incorporated by reference in its entirety.

BACKGROUND

Technical Field

The following disclosure relates to a copy system, a copy method, a reading apparatus, and an image recording apparatus.

Description of the Related Art

There is known a copy system including an image recording apparatus and a reading apparatus communicable with each other. In this copy system, the reading apparatus reads a document to create image data representative of an image recorded on the document and transmits the created image data to the image recording apparatus. The image recording apparatus receives the image data from the reading apparatus and records the image on a sheet, such as a paper sheet, based on the received image data. As a result, the copy of the document is produced.

SUMMARY

In the conventional copy system, users have to perform complicated operations on an operation device of the reading apparatus to set a destination to which image data is to be transmitted. Examples of the complicated operations include: an operation for selecting a desired image recording apparatus as a destination device from among a plurality of destination devices stored in advance; and an operation for inputting a new destination device in the case where a desired image recording apparatus is not stored as a destination device.

Accordingly, an aspect of the disclosure relates to a copy system, a copy method, a reading apparatus, and an image recording apparatus, capable of eliminating complicated operations.

In one aspect of the disclosure, a copy system includes: an image recording apparatus; and a reading apparatus. The image recording apparatus includes: a recording device configured to record an image on a sheet; a recording-apparatus communication device configured to communicate with an external device; and a recording-apparatus controller configured to control the image recording apparatus. The reading apparatus includes: a reading device configured to read at least one document; a reading-apparatus communication device configured to communicate with an external device; and a reading-apparatus controller configured to control the reading apparatus. The recording-apparatus controller is configured to perform: controlling the recording device to record a particular code indicating communication information identifying the recording-apparatus communication device; receiving image data via the recording-apparatus communication device; and controlling the recording device to record at least one image based on the received image data. The reading-apparatus controller is configured to perform: controlling the reading device to read at least one document to create image data; and analyzing the created image data and determining whether the created image data contains the particular code in units of pages of the at least one document. The reading-apparatus controller is configured to, when determining that the created image data contains the particular code, perform: obtaining the communication information indicated by the particular code, based on the created image data; and transmitting particular image data of the created image data to a destination identified by the communication information via the reading-apparatus communication device, the particular image data corresponding to a portion of the created image data.

In another aspect of the disclosure, a copy method uses (i) an image recording apparatus including a recording-apparatus communication device configured to communicate with an external device and (ii) a reading apparatus including a reading-apparatus communication device configured to communicate with an external device. The copy method includes: causing the image recording apparatus to record, on a sheet, a particular code indicating communication information identifying the recording-apparatus communication device; causing the image recording apparatus to receive image data via the recording-apparatus communication device; causing the image recording apparatus to record at least one image on at least one sheet based on the received image data; causing the reading apparatus to read at least one document to create image data; causing the reading apparatus to analyze the created image data and determine whether the created image data contains the particular code in units of pages of the at least one document; when the reading apparatus determines that the created image data contains the particular code, causing the reading apparatus to obtain the communication information indicated by the particular code in the created image data; and when the reading apparatus determines that the created image data contains the particular code, causing the reading apparatus to transmit particular image data of the created image data to a destination identified by the communication information, the particular image data corresponding to a portion of the created image data.

In another aspect of the disclosure, a reading apparatus includes: a reading device configured to read at least one document; a reading-apparatus communication device configured to communicate with an image recording apparatus; and a reading-apparatus controller. The reading-apparatus controller is configured to perform: controlling the reading device to read at least one document to create image data; and analyzing the created image data and determining whether the created image data contains the particular code in units of pages of the at least one document. The reading-apparatus controller is configured to, when determining that the created image data contains the particular code, perform: obtaining (i) communication information indicating the particular code contained in the image data and (ii) copy setting information indicating a particular setting for an item related to a copy process to be executed by the reading apparatus and the image recording apparatus; and determining a reading setting for creation of the image data based on the copy setting information. The reading-apparatus controller is configured to, when determining that the created image data contains the particular code, perform: controlling the reading device to read, at the determined reading setting, at least one page different from a page containing the particular code among the at least one document; and transmitting particular image data of the created image data to a destination identified by the communication information via the reading-apparatus communication device, the particular image data corresponding to a portion of the created image data and containing image data representative of the read at least one page.

In another aspect of the disclosure, an image recording apparatus includes: a recording device configured to record an image on a sheet; a recording-apparatus communication device configured to communicate with a reading apparatus; a recording-apparatus operation device; and a recording-apparatus controller. The recording-apparatus controller is configured to perform: accepting, from the recording-apparatus operation device, settings for a plurality of setting items related to a copy process to be executed by the reading apparatus and the image recording apparatus; extracting, from the received settings for the plurality of setting items, a setting for a setting item required for determination of a reading setting in a reading processing; controlling the recording device to record a particular code indicating (i) communication information identifying the recording-apparatus communication device and (ii) extracted copy setting information indicating the extracted setting; receiving image data via the recording-apparatus communication device; and controlling the recording device to record at least one image based on the received image data at the accepted settings for the plurality of setting items.

It is noted that the technique according to this disclosure may be implemented in various forms including a non-transitory storage medium storing a plurality of instructions to be executed by a computer of any device.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

First Embodiment

1. Configuration of Copy System 10

Figure 1:
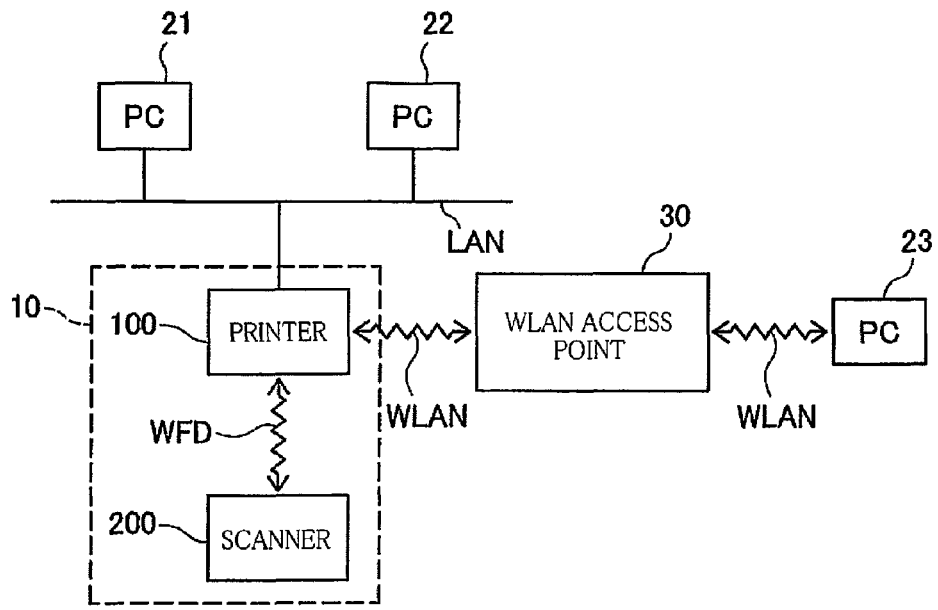
FIG. 1 is a view for explaining a configuration of a copy system according to a first embodiment.

FIG. 1 illustrates a copy system 10 according to a first embodiment. The copy system 10 is a system for copying a document and includes: a scanner 200 configured to scan and read a document to create image data representative of an image recorded on the document; and a printer 100 configured to record an image on a sheet, such as a paper sheet, based on image data. The printer 100 is one example of an image recording apparatus, and the scanner 200 is one example of a reading apparatus.

The printer 100 is capable of using Wi-Fi Direct® (registered trademark of Wi-Fi Alliance). This Wi-Fi Direct will be hereinafter referred to as "WFD". The WFD is one of wireless communication standards defined by the Wi-Fi Alliance. The WFD enables devices to directly perform wireless-LAN communications with each other without requiring a wireless-LAN access point. The printer 100 is capable of selectively enabling and disabling the WFD. In a state in which the WFD is enabled in the printer 100, external devices such as the scanner 200 recognize the printer 100 as an access point of the wireless LAN. When the scanner 200 accesses the printer 100, wireless communication is established between the scanner 200 and the printer 100 according to the WFD. The WFD is one example of a first communication standard.

In the example illustrated in FIG. 1, the printer 100 is capable of communicating with external devices, e.g., a PC 21 and a PC 22, over wired LAN and capable of communicating with external devices, e.g., a PC 23, over normal wireless LAN using a wireless-LAN access point 30. The normal wireless LAN will be hereinafter referred to as "WLAN".

Figure 2:
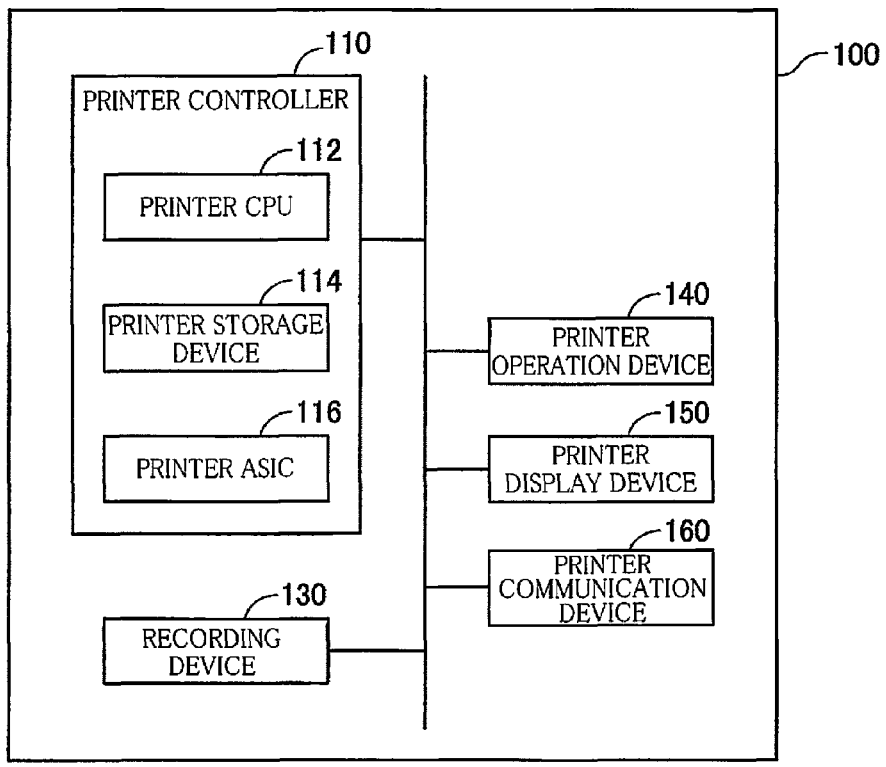
FIG. 2 is a view for explaining a configuration of a printer.

As illustrated in FIG. 2, the printer 100 includes a controller 110. It is noted that this controller will be hereinafter referred to as "printer controller" for distinction of a controller of the scanner 200, and such a distinction will be made for other devices of the printer 100 and the scanner 200. The printer 100 further includes a recording device 130, a printer operation device 140, a printer display device 150, and a printer communication device 160. The printer controller 110 includes a printer CPU 112, a printer storage device 114, and a printer ASIC 116.

The recording device 130 is an electronic photographic or ink-jet recording mechanism configured to record an image on the sheet, for example. The printer operation device 140 includes various kinds of buttons, not shown, for example, and accepts instructions and inputs from a user. The printer operation device 140 may be constituted by a touchscreen superposed on a display surface of the printer display device 150. The printer display device 150 includes a liquid crystal display, for example, and displays various kinds of setting screens and an operating state of the printer 100. The printer communication device 160 is hardware for communicating with external devices and includes a LAN interface and a wireless LAN interface, for example. As described above, the printer communication device 160 of the printer 100 is capable of using the WFD. The printer operation device 140 is one example of a recording-apparatus operation device, and the printer communication device 160 is one example of a recording-apparatus communication device.

The printer storage device 114 including a ROM and a RAM stores various kinds of programs and is used as a working area during execution of the various kinds of programs and as a temporary storage area for data. Though explained later in detail, the printer storage device 114 stores second identification information and communication information used in a copy process. The second identification information is information used for distinguishing a QR Code® (registered trademark of Denso Wave) created and recorded by the printer 100 for the copy process, from other QR codes. The printer CPU 112 executes processings according to a program read from the printer storage device

114. The printer ASIC 116 is a hardware circuit for the image processing, for example. The printer controller 110 controls the devices of the printer 100. For example, the printer controller 110 executes a recording processing to control the recording device 130 to record an image on the sheet. The printer controller 110 or the printer CPU 112 is one example of a recording-apparatus controller, and the printer storage device 114 is one example of a recording-apparatus storage device.

Figure 3:
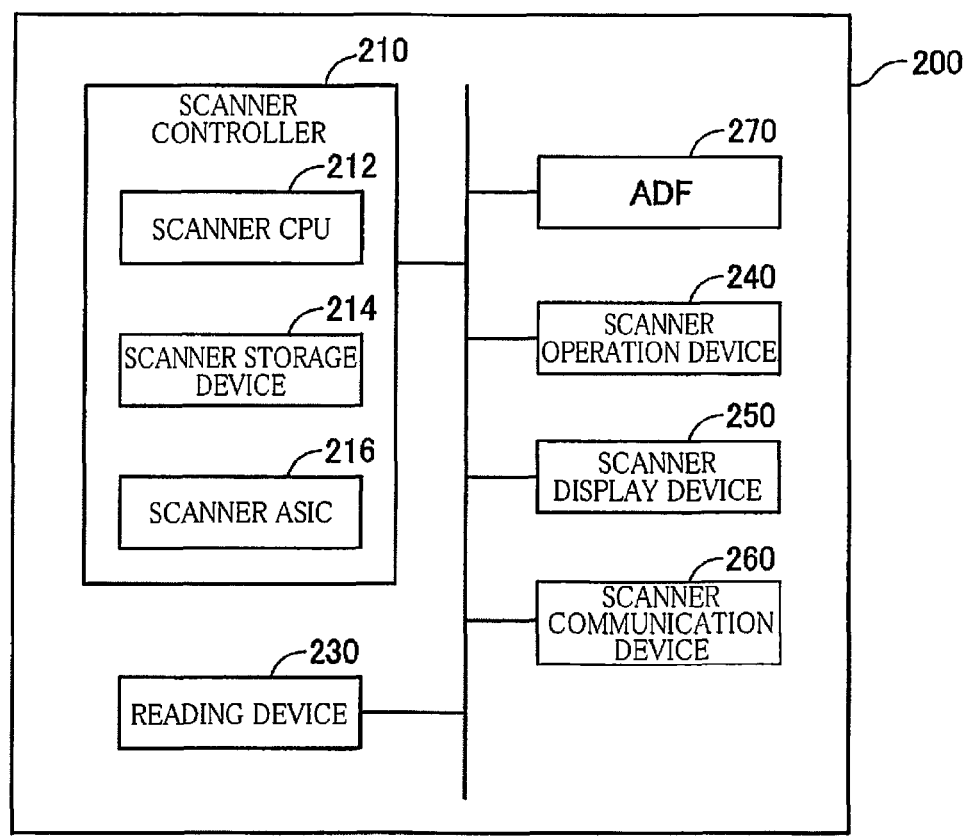
FIG. 3 is a view for explaining a configuration of a scanner.

As illustrated in FIG. 3, the scanner 200 includes a scanner controller 210, a reading device 230, a scanner operation device 240, a scanner display device 250, a scanner communication device 260, and an automatic document feeder (ADF) 270. The scanner controller 210 includes a scanner CPU 212, a scanner storage device 214, and a scanner ASIC 216.

The ADF 270 includes a conveyance path and conveying rollers for conveying a document on the conveyance path. The ADF 270 causes a motor to rotate the conveying rollers to convey documents one by one to the reading device 230 on a page-by-page basis (in units of pages). The reading device 230 is a CCD or CIS image sensor for reading the documents conveyed from the ADF 270, for example. The scanner operation device 240 includes various kinds of buttons, not shown, for example, and accepts instructions and inputs from a user. The scanner operation device 240 may be constituted by a touchscreen superposed on a display surface of the scanner display device 250. The scanner display device 250 includes a liquid crystal display, for example, and displays various kinds of setting screens and an operating state of the scanner 200. The scanner communication device 260 is hardware for communicating with external devices and includes a wireless LAN interface, for example. The scanner communication device 260 is one example of a reading-apparatus communication device, and the ADF 270 is one example of a document conveying device.

The scanner storage device 214 including a ROM and a RAM stores various kinds of programs and is used as a working area during execution of the various kinds of programs and as a temporary storage area for data. The scanner storage device 214 also stores the second identification information stored in the printer storage device 114. The scanner CPU 212 executes processings according to a program read from the scanner storage device 214. The scanner ASIC 216 is a hardware circuit for the image processing, for example. The scanner controller 210 controls the devices of the scanner 200. For example, the scanner controller 210 executes a reading processing to create image data based on reading signals transmitted from the reading device 230. The scanner controller 210 or the scanner CPU 212 is one example of a reading-apparatus controller, and the scanner storage device 214 is one example of a reading-apparatus storage device.

2. Copy Process

The copy system 10 according to the first embodiment can execute the copy process. In the copy process, the scanner 200 reads documents to create image data representative of images recorded on the documents, and the printer 100 records images on the sheets based on the created image data, whereby copies of the documents are created.

Figure 4:
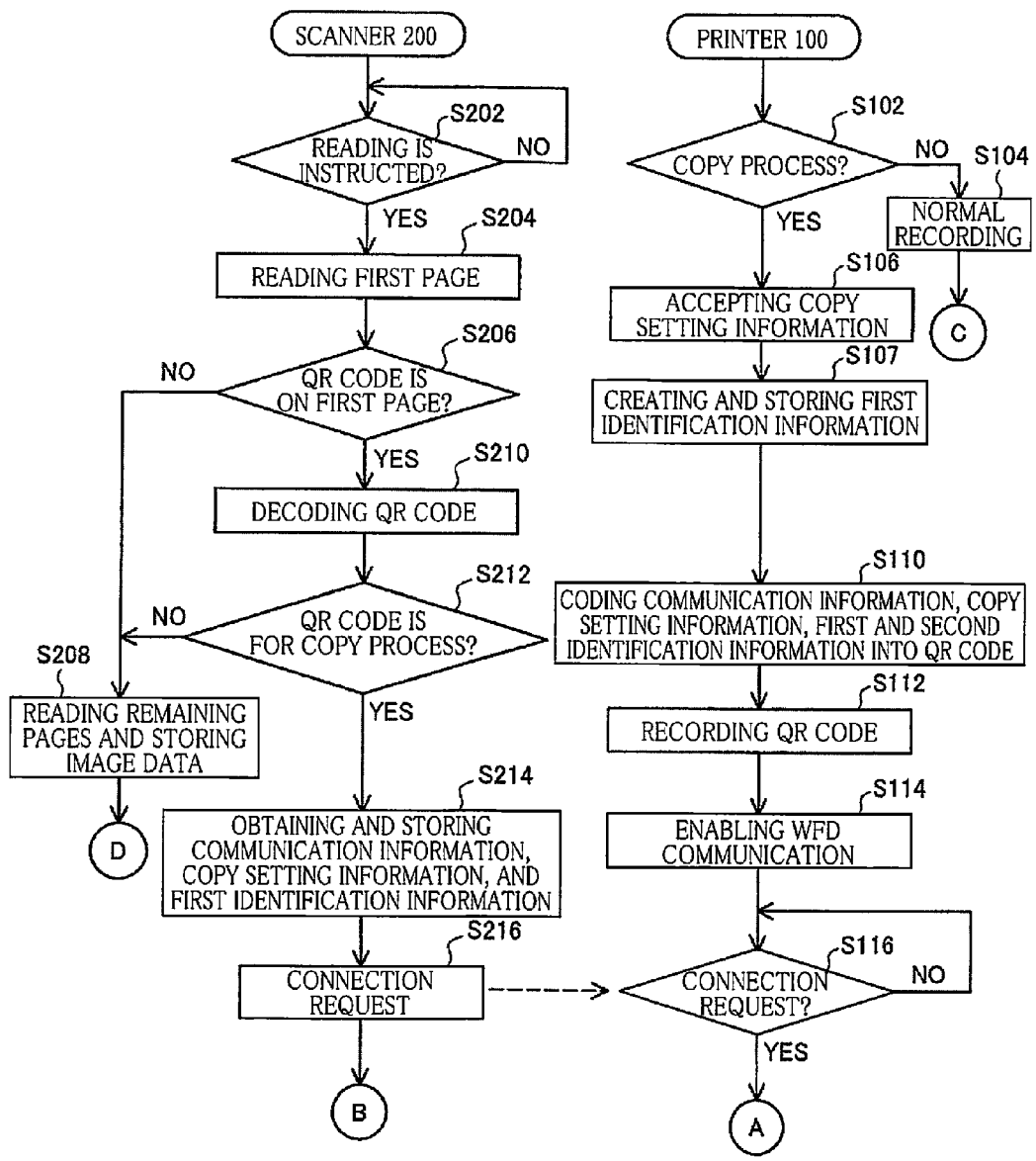
FIG. 4 is a flow chart illustrating a copy process executed by the copy system according to the first embodiment.
Figure 5:
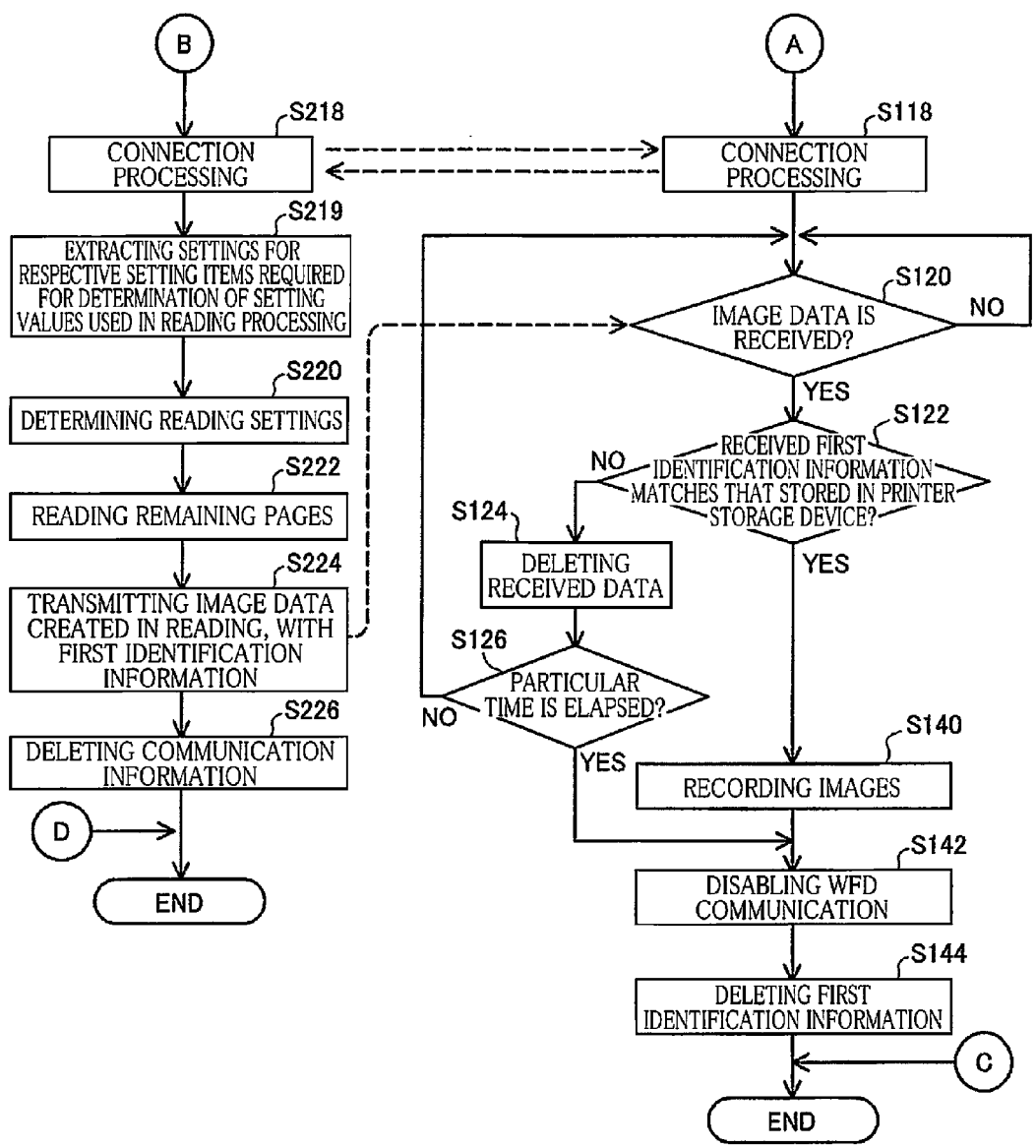
FIG. 5 is another flow chart illustrating the copy process executed by the copy system according to the first embodiment.

FIGS. 4 and 5 illustrate a flow of the copy process executed by the copy system 10 according to the first embodiment. This flow begins when the printer 100 accepts an instruction of execution of the copy process. Before the start of the copy process illustrated in FIGS. 4 and 5, the printer communication device 160 of the printer 100 is set such that the WLAN is enabled, but the WFD is disabled. Thus, in this state, the printer 100 is not recognized as an access point of the wireless LAN by other devices.

This flow begins at S102 at which the printer controller 110 determines whether the accepted instruction indicates execution of a normal recording processing or execution of the copy process. When the user who wants to perform normal recording inputs an instruction of execution of the normal recording processing into the printer 100 via, e.g., the printer operation device 140, the printer controller 110 determines that the input instruction indicates execution of the normal recording processing (S102: NO). The printer controller 110 at S104 controls the recording device 130 to execute the normal recording processing, and this flow ends.

When the user who wants to perform the copy process inputs an instruction of execution of the copy process into the printer 100 via, e.g., the printer operation device 140, the printer controller 110 determines that the input instruction indicates execution of the copy process (S102: YES), the printer controller 110 starts processings for the copy process. Specifically, the printer controller 110 at S106 accepts settings respectively for a plurality of copy setting items via, e.g., the printer operation device 140. Each of the copy setting items is an item of setting of the copy process. Examples of the copy setting items include: a recording resolution, in a main scanning direction and/or a sub-scanning direction, for the documents to be created in the copy process; color recording or monochrome recording; and the number of copies.

The printer controller 110 at S107 executes an identification-information storing processing for creating a character string according to a predetermined algorithm to store the character string into the printer storage device 114 as first identification information. The first identification information is used for determination of whether a device having transmitted image data received by the printer 100 is a reading apparatus having executed a reading processing for a sheet on which the QR code is recorded by the printer 100.

Figure 6:
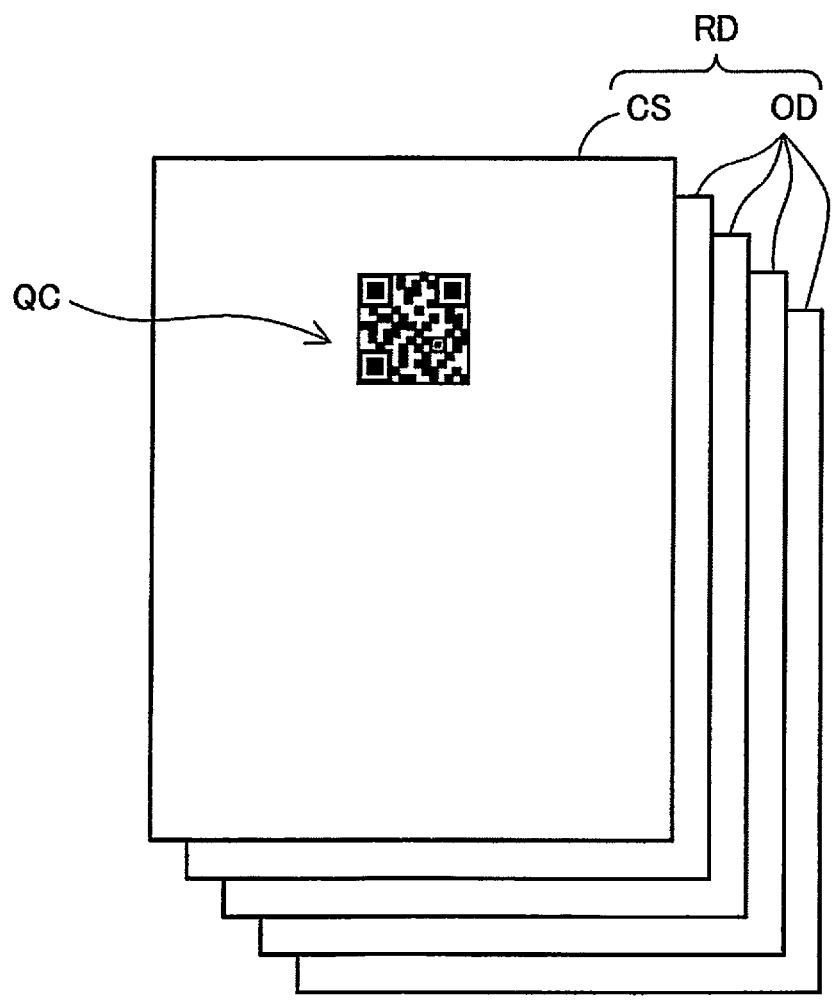
FIG. 6 is a view for explaining one example of the reading documents constituted by a code recorded sheet and original documents.

At S110, the printer controller 110 creates text data indicating (i) the communication information stored in the printer storage device 114, (ii) copy setting information indicating the settings for the respective copy setting items, (iii) the first identification information created at S107, and (iv) the second identification information stored in the printer storage device 114 in advance, and the printer controller 110 codes the created text data into a QR code. The printer controller 110 at S112 executes a code recording processing for controlling the recording device 130 to record the QR code on the sheet. It is noted that, when creating the text data, the printer controller 110 may give item names to the communication information, the copy setting information, the first identification information, and the second identification information for their distinction. Also, without giving the item names, the printer controller 110 may create the text data such that the text data contains the four sets of information in the order determined in advance. In any case, the scanner controller 210 can distinguish the four sets of information from each other in the text data created by the printer controller 110. The sheet on which the QR code is recorded by the recording device 130 will be hereinafter referred to as "code recorded sheet CS". It should be noted that this code recorded sheet CS is one kind of a document to be read by the reading apparatus. That is, examples of the document include any kind of sheet on which information, such as an image or characters, is described or depicted. FIG. 6 illustrates one example of the code recorded sheet CS on which the QR code (QC) is recorded. The QR code is one kind of two-dimensional code and is one example of a particular code. The printer storage device 114 stores a program for creating the QR code. When the printer CPU 112 executes this program, the text data indicating each set of the information is encoded, and coded into the QR code.

The communication information is information that identifies the printer communication device 160. In the present embodiment, the communication information contains a service set identifier (SSID) and a communication password used when the printer communication device 160 carries out communications using the WFD.

The printer controller 110 at S114 executes a first communication setting processing for setting the printer communication device 160 to a state in which the WFD communication is enabled using the communication information. As a result of the first communication setting processing, the printer 100 is recognized as an access point of the wireless LAN by external devices. The printer controller 110 at S116 monitors whether a connection request is received from an external device.

Incidentally, the scanner controller 210 of the scanner 200 at S202 monitors whether a reading instruction is accepted by the scanner operation device 240. When the reading instruction is accepted (S202: YES), the scanner controller 210 at S204 executes the reading processing for the first page of the documents. Specifically, the scanner controller 210 controls the ADF 270 to convey a document of the first page among the documents placed on the ADF 270 (hereinafter may be referred to as "reading documents RD") to the reading device 230, then controls the reading device 230 to read the first-page document, and then executes various processings (e.g., A/D conversion processing and image processing) for signals transmitted from the reading device 230, whereby the scanner controller 210 creates image data representative of the first page of the reading document RD.

Figure 7:
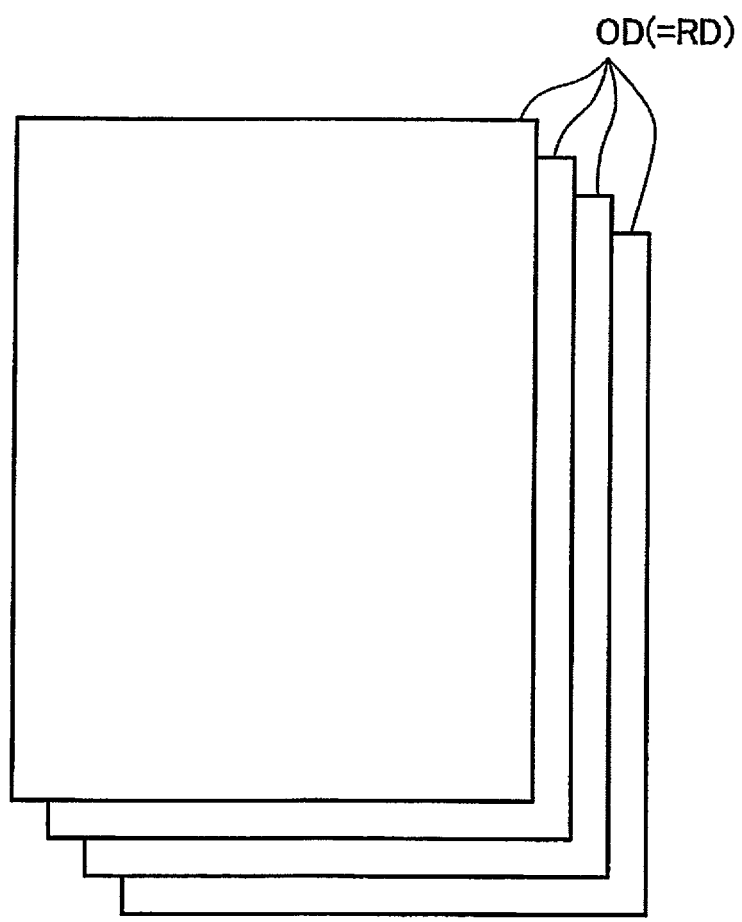
FIG. 7 is a view for explaining another example of the reading documents RD constituted by only the original documents.

Here, the user who wants to perform the copy process for documents (hereinafter may be referred to as original documents OD) sets the original documents OD and the code recorded sheet CS created by the printer 100 onto the ADF 270 in a state in which the code recorded sheet CS is placed on an uppermost one of the original documents OD. That is, in this case, the reading documents RD set on the ADF 270 are constituted by the original documents OD and the code recorded sheet CS placed on the original documents OD. FIG. 6 illustrates one example of the reading documents RD constituted by the original documents OD and the code recorded sheet CS. Thus, in this case, not the original documents OD but the code recorded sheet CS is read in the reading processing at S204. In the case where the user wants to perform normal reading of the original documents OD to create image data, the user sets only the original documents OD onto the ADF 270. That is, in this case, the reading documents RD placed on the ADF 270 are identical to the original documents OD. FIG. 7 illustrates one example of the reading documents RD constituted by only the original documents OD. In this case, only a first-page document of the original documents OD is read in the reading processing at S204.

The scanner controller 210 at S206 analyzes the image data created in the reading processing at S204 and executes a code-presence determination processing for determining whether the image data contains the QR code. The scanner storage device 214 stores a program for recognizing the QR code from the image data. The scanner CPU 212 executes this program to execute the determination of whether the image data contains the QR code.

When the QR code is not contained in the image data created in the reading processing at S204 (S206: NO), the scanner controller 210 at S208 executes the reading processing for the other pages (remaining pages) of the reading documents RD to create image data and stores image data representative of all the pages of the reading documents RD, and this flow ends. When the QR code is not contained in the image data created in the reading processing at S204, the documents, based on which the image data is created, are not the code recorded sheet CS. Thus, the scanner controller 210 determines that not copying of the original documents OD but normal creation of image data is required. Accordingly, the scanner controller 210 executes the normal creation of the image data based on the original documents OD. In this case, the image data may be stored into the scanner storage device 214. In the case where an external storage medium is connected to the scanner 200, for example, in the case where the scanner 200 includes a USB interface, not shown, and a USB memory is connected to the USB interface, the image data may be stored into the external storage medium.

When the QR code is contained in the image data created in the reading processing at S204 (S206: YES), the scanner controller 210 at S210 decodes the QR code and at S212 executes an identification-information determination processing. In this identification-information determination processing, the scanner controller 210 determines whether the QR code is a QR code created or recorded for the copy process, that is, the scanner controller 210 determines whether a document, based on which the image data is created, is the code recorded sheet CS. The scanner controller 210 executes this determination by determining whether text data obtained by decoding the QR code contains information identical to the second identification information stored in the scanner storage device 214. As described above, the QR code recorded on the code recorded sheet CS contains the second identification information. Thus, by determining whether the QR code contains the second identification information, the scanner controller 210 can determine whether the QR code is the QR code created and recorded for the copy process. That is, the second identification information serves as what is called a magic number. It is noted that the scanner storage device 214 stores a program for decoding the QR code, and the scanner CPU 212 executes this program to decode the QR code.

When the QR code is not the QR code created and recorded for the copy process (S212: NO), the scanner controller 210 at S208 executes the reading processing for the other pages of the reading documents RD to create image data and stores image data representative of all the pages of the reading documents RD, and this flow ends.

When the QR code is the QR code created and recorded for the copy process (S212: YES), the scanner controller 210 at S214 executes an information obtaining processing for obtaining the communication information, the copy setting information, and the first identification information contained in text data obtained by decoding the QR code and executes an information storing processing for storing the obtained sets of information into the scanner storage device 214.

The scanner controller 210 at S216 controls the scanner communication device 260 to transmit a connection request to a device identified by the obtained communication information. As described above, the obtained communication information contains the SSID and the communication password used when the printer communication device 160 of the printer 100 carries out communications using the WFD.

The scanner controller 210 issues a wireless-LAN connection request designating the SSID identified by the communication information.

As described above, the printer controller 110 of the printer 100 at S112 creates the code recorded sheet CS, at S114 sets the printer communication device 160 to the state in which the WFD communication is enabled using the communication information, and S116 monitors whether a connection request is received from an external device. When the connection request transmitted from an external device such as the scanner 200 is received by the printer communication device 160 (S116: YES), the printer controller 110 at S118 executes a connection processing, including reception of the communication password, for establishing connection with the device having transmitted the connection request. The scanner controller 210 of the scanner 200 can identify the communication password based on the communication information obtained from the QR code. Thus, the scanner controller 210 can at S218 execute the connection processing including transmission of the communication password to establish wireless connection with the printer 100.

When the wireless connection is established between the scanner 200 and the printer 100, the scanner controller 210 at S219 extracts, from the copy setting information obtained at S214, settings for respective setting items required for determination of setting values used in the reading processing. As described above, the copy setting information indicates the settings for the respective setting items in the copy process and includes: a recording resolution, in a main scanning direction and/or a sub-scanning direction, for the documents to be created in the copy process; color recording or monochrome recording; and the number of copies. In the present embodiment, the setting items are the recording resolution and one of the color recording and the monochrome recording. That is, the setting items required for determination of the setting values used in the reading processing are setting items for designating conditions of image data used in the recording processing of the copy process. Based on the extracted settings, the scanner controller 210 at S220 determines reading settings which are used when the reading device 230 reads the original documents OD. In this processing, the scanner controller 210 determines reading settings with the lowest load among reading settings satisfying (sufficient for) the extracted settings. For example, in the case where any of 1200 dpi, 600 dpi, and 300 dpi can be set as a reading resolution in the sub-scanning direction in the reading device 230 of the scanner 200, when the copy setting information indicates that the recording resolution is set at 600 dpi, the scanner controller 210 can select one of 600 dpi and 1200 dpi as the reading settings satisfying the extracted settings. In the present embodiment, the scanner controller 210 selects 600 dpi as the reading setting in this example because a load is lower at 600 dpi than at 1200 dpi. Also, in the case where the reading device 230 of the scanner 200 is capable of performing both of the color reading and the monochrome reading, when the copy setting information indicates the monochrome recording, the scanner controller 210 selects the monochrome reading as the reading settings satisfying the extracted settings.

The scanner controller 210 at S222 executes the reading processing for the documents of the other pages, i.e., the original documents OD, among the reading documents RD placed on the ADF 270. Specifically, the scanner controller 210 controls the ADF 270 to convey the original documents OD placed on the ADF 270 one by one to the reading device 230 on a page-by-page basis, then controls the reading device 230 to read the documents, and then executes the various kinds of processings for signals transmitted from the reading device 230, whereby the scanner controller 210 creates image data representative of the original documents OD. This reading processing is executed at the reading settings determined at S220. The image data representative of the original documents OD is one example of particular image data.

The scanner controller 210 at S224 executes a transmission processing for transmitting the image data created based on the original documents OD in the reading processing at S222, together with the first identification information, to the printer communication device 160 via the scanner communication device 260. It is noted that the first identification information can be stored into, e.g., a header area of the image data. In this case, the first identification information is stored so as to be paired with an item name indicating the first identification information, whereby the printer controller 110 can recognize the first identification information in the form of the character string, as the first identification information. After the transmission processing at S224, the scanner controller 210 at S226 executes a communication-information deleting processing for deleting the communication information stored in the scanner storage device 214 at S214, and this flow ends.

When the wireless connection is established between the printer 100 and an external device using the WFD, the printer controller 110 of the printer 100 at S120 monitors whether image data is received from the external device. When the image data is received (S120: YES), the printer controller 110 at S122 executes a first match-determination processing for determining whether the first identification information is received with the image data and whether the received first identification information matches (is identical to) the first identification information stored in the printer storage device 114 at S107. It is noted that since the first identification information is stored in a predetermined area, e.g., the header area of the image data, in the case where the character string is contained in the predetermined area so as to be paired with the item name indicating the first identification information, the printer controller 110 can execute the processing at S122 by determining whether the character string matches the first identification information stored in the printer storage device 114. This first match-determination processing is a processing for determining whether a device having transmitted the image data received at S120 is a reading apparatus having executed the reading processing for the sheet on which the QR code is recorded by the printer 100, i.e., the code recorded sheet CS.

When the printer controller 110 determines in the first match-determination processing that the first identification information is not received with the image data or that the first identification information is received with the image data but does not match the first identification information stored in the printer storage device 114 at S107 (S122: NO), the printer controller 110 at S124 determines that the device having transmitted the image data is not the reading apparatus having executed the reading processing for the code recorded sheet CS, and deletes the received image data. The printer controller 110 at S126 determines whether a particular length of time has passed from completion of the first communication setting processing at S114 for setting the printer communication device 160 to the state in which the WFD communication is enabled. When the particular length of time has not passed (S126: NO), this flow returns to S120 at which the printer controller 110 monitors whether the image data is received.

When the printer controller 110 determines in the first match-determination processing that the first identification information is received with the image data and that the received first identification information matches the first identification information stored in the printer storage device 114 at S107 (S122: YES), the printer controller 110 determines that the device having transmitted the image data is the reading apparatus having executed the reading processing for the code recorded sheet CS, and this flow goes to S140. The printer controller 110 at S140 executes an image recording processing for controlling the recording device 130 to record images based on the received image data, i.e., the image data representative of the original documents OD. As a result, the copy of the original documents OD is printed.

In the present embodiment, the copy settings accepted at S106 is used for this image recording processing. Thus, the printer controller 110 stores copy setting information indicating the copy settings, into the printer storage device 114 in association with the first identification information, and then the printer controller 110 in the image recording processing reads the copy setting information associated with the first identification information received from the scanner 200 and makes settings of the recording device 130. Alternatively, the copy system 10 may be configured such that the scanner controller 210 transmits, with the image data, the copy setting information obtained from the QR code, and the printer controller 110 makes settings of the recording device 130 according to the copy setting information received from the scanner 200.

The printer controller 110 at S142 executes a second communication setting processing for setting the printer communication device 160 to a state in which the WFD communication is disabled using the SSID contained in the communication information. As a result of this second communication setting processing, the printer 100 is not recognized as the access point of the wireless LAN by external devices. The printer controller 110 at S144 executes an identification-information deleting processing for deleting the first identification information stored at S107 in the printer storage device 114.

Also when the printer controller 110 at S126 determines that the particular length of time has passed (S126: YES), that is, when the particular length of time has passed without reception of the first identification information that matches the first identification information stored in the printer storage device 114, the printer controller 110 at S142 executes the second communication setting processing for setting the printer communication device 160 to the state in which the WFD communication is disabled using the SSID contained in the communication information, and the printer controller 110 at S144 executes the identification-information deleting processing for deleting the first identification information stored in the printer storage device 114.

In the copy system 10 according to the present embodiment, as described above, the copy process can be executed for producing the copy of the original documents OD. In the copy process, the printer controller 110 executes the recording processing for controlling the recording device 130 to record the QR code indicating the communication information that identifies the printer communication device 160. Also, the scanner controller 210 executes the reading processing for controlling the reading device 230 to read the reading documents RD to create the image data and analyzes the image data created in the reading processing to execute the code-presence determination processing for determining whether the image data contains the QR code. When the scanner controller 210 in the code-presence determination processing determines that the reading documents RD contains the QR code, the scanner controller 210 executes the information obtaining processing for obtaining the communication information indicated by the QR code. The scanner controller 210 executes the reading processing for creating image data based on the pages (i.e., the original documents OD) read after the page containing the QR code (i.e., the code recorded sheet CS) among the reading documents RD and executes the transmission processing for transmitting the created image data to the destination device identified by the communication information, via the scanner communication device 260. The printer controller 110 executes the reception processing for receiving the image data from the scanner 200 via the printer communication device 160 and executes the image recording processing for controlling the recording device 130 to record images based on the received image data. In the copy system 10 according to the present embodiment, accordingly, the user does not need to perform complicated operations on the scanner 200 for setting a destination of transmission of the image data and can instruct the scanner 200 to transmit the image data to the printer 100 by only causing the scanner 200 to read the code recorded sheet CS created by the printer 100, whereby the copy process for the original documents OD can be executed. This configuration improves usability of the copy system 10 when the original documents OD are copied.

In the copy process in the copy system 10 according to the present embodiment, the printer controller 110 executes the identification-information storing processing for storing the first identification information into the printer storage device 114 and executes the code recording processing for recording not only the communication information but also the QR code indicating the first identification information. The scanner controller 210 executes the information obtaining processing for obtaining the first identification information in addition to the communication information and executes the transmission processing for transmitting the first identification information in addition to the image data. The printer controller 110 executes the reception processing for receiving the first identification information in addition to the image data, executes the first match-determination processing for determining whether the received first identification information matches the first identification information stored in the printer storage device 114, and executes the image recording processing when the printer controller 110 determines in the first match-determination processing that the received first identification information matches the first identification information stored in the printer storage device 114. In the copy system 10 according to the present embodiment as described above, the printer controller 110 executes the first match-determination processing for determining whether the device having transmitted the image data received by the printer 100 is the scanner 200 that has executed the reading processing for the code recorded sheet CS created by the printer 100. This processing can prevent execution of the recording processing using image data transmitted from a device not intended, with achievement of the copy process for the original documents OD read by the scanner 200.

In the copy process in the copy system 10 according to the present embodiment, when the printer controller 110 determines in the first match-determination processing that the received first identification information matches the first identification information stored in the printer storage device 114, the printer controller 110 executes the identification-information deleting processing for deleting the first identification information from the printer storage device 114. Accordingly, after the printer controller 110 determines in the first match-determination processing that the received first identification information matches the first identification information stored in the printer storage device 114, even when the scanner 200 executes the transmission processing for transmitting the same first identification information again, the printer controller 110 does not determine in the next first match-determination processing that the received first identification information matches the first identification information stored in the printer storage device 114. This processing can prevent execution of the recording processing using image data created by a reading processing not intended, with achievement of the copy process for the original documents OD read by the scanner 200.

In the copy process in the copy system 10 according to the present embodiment, the printer controller 110 executes the code recording processing for controlling the recording device 130 to record the QR code indicating the communication information about the communication standard of the WFD in the printer communication device 160 and executes the first communication setting processing for setting the printer communication device 160 to the state in which the communication according to the communication information about the communication standard of the WFD is enabled. When the printer controller 110 determines in the first match-determination processing that the received first identification information matches the first identification information stored in the printer storage device 114, the printer controller 110 executes the second communication setting processing for setting the printer communication device 160 to the state in which the communication according to the communication information about the communication standard of the WFD is disabled. In view of the above, the printer communication device 160 is temporarily set in the state in which the communication according to the communication information about the communication standard of the WFD is enabled, in a period extending from completion of the first communication setting processing to completion of the second communication setting processing, and the printer communication device 160 is set in the state in which the communication is disabled, in the other period. Accordingly, after the printer controller 110 determines in the first match-determination processing that the received first identification information matches the first identification information stored in the printer storage device 114, the wireless connection is not established even when the scanner 200 is to execute the transmission processing for transmitting the image data again. This processing can prevent execution of the recording processing using image data created by a reading processing not intended, with achievement of the copy process for the original documents OD read by the scanner 200.

In the copy process in the copy system 10 according to the present embodiment, the printer controller 110 executes the second communication setting processing also after the particular length of time has passed from completion of the first communication setting processing. This processing can prevent establishment of wireless connection between the printer 100 and a device not intended, with achievement of the copy process for the original documents OD read by the scanner 200.

In the copy process in the copy system 10 according to the present embodiment, the scanner controller 210 executes the communication-information storing processing for storing the communication information obtained from the QR code, into the scanner storage device 214 and executes the communication-information deleting processing for deleting the communication information from the scanner storage device 214 after the transmission processing for transmitting the image data to the printer 100. Accordingly, after the scanner 200 executes the transmission processing, even when the scanner 200 is to execute the transmission processing again, the destination of transmission cannot be identified because the communication information is deleted. This processing can prevent execution of the recording processing using image data created by a reading processing not intended, with achievement of the copy process for the original documents OD read by the scanner 200.

In the copy process in the copy system 10 according to the present embodiment, the printer controller 110 executes the code recording processing for recording not only the communication information but also the QR code indicating the second identification information. When the scanner controller 210 determines in the code-presence determination processing that the reading documents RD contains the QR code, the scanner controller 210 executes the identification-information determination processing for determining whether the QR code contains the second identification information. When the QR code contains the second identification information, the scanner controller 210 executes the information obtaining processing. Accordingly, even if the reading documents RD contain a QR code different from the QR code for the copy process, this copy system 10 can prevent erroneous execution of the copy process.

In the copy process in the copy system 10 according to the present embodiment, the printer controller 110 executes the code recording processing for recording not only the communication information but also the QR code indicating the copy setting information that indicates the settings for the copy process to be executed between the scanner 200 and the printer 100. The scanner controller 210 executes the information obtaining processing for obtaining the copy setting information in addition to the communication information and executes the reading processing for controlling the reading device 230 to read the original documents OD at the reading settings satisfying the copy setting information. These processings can prevent execution of the reading processing at reading settings not satisfying the settings for the copy process. Accordingly, it is possible to reduce an increase in load of processing while ensuring a quality of the copy of the original documents OD created in the copy process.

In the copy process in the copy system 10 according to the present embodiment, the scanner controller 210 executes the code-presence determination processing for determining whether the QR code has been recorded, for the page (i.e., the document) conveyed first by the reading device 230 among the reading documents RD. The scanner controller 210 does not execute the code-presence determination processing for the other pages of the reading documents RD. This configuration can prevent execution of unnecessary code-presence determination processings, making it possible to reduce an increase in load of processing.

In the copy process in the copy system 10 according to the present embodiment, information such as image data is transmitted and received over the wireless communication between the scanner 200 and the printer 100. Accordingly, the copy process can be executed without connection between the scanner 200 and the printer 100 with cables.

In the copy process in the copy system 10 according to the present embodiment, information such as image data is transmitted and received via the wireless communication of the WFD between the scanner 200 and the printer 100, and the communication information contains the SSID in the wireless communication of the WI-D. Accordingly, wireless connection can be established between the scanner 200 and the printer 100 to execute the copy process even in the case of absence of the wireless-LAN access point 30 for relaying the wireless communication between the scanner 200 and the printer 100.

Figure 8:
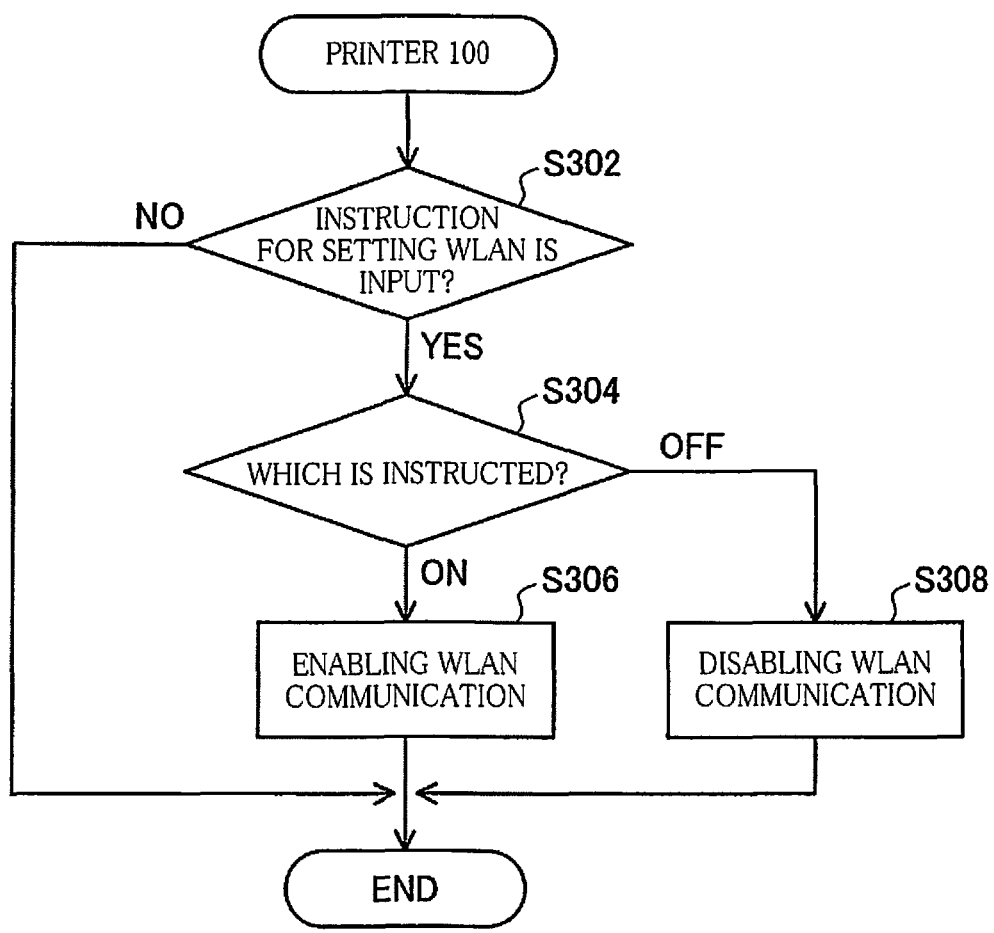
FIG. 8 is a flow chart illustrating a WLAN-communication enable/disable switching processing executed by a printer communication device.

It is noted that, as described above, the printer communication device 160 is temporarily set in the state in which the communication according to the communication information about the communication standard of the WFD is enabled, in the period extending from completion of the first communication setting processing to completion of the second communication setting processing, and the printer communication device 160 is set in the state in which the communication is disabled, in the other period. On the other hand, enabling and disabling of communication of the printer communication device 160 over the WLAN are selectively switched in response to user operation. FIG. 8 is a flow chart illustrating a WLAN-communication enable/disable switching processing executed by the printer communication device 160. This flow begins with S302 at which the printer controller 110 determines whether an instruction for setting the WLAN is input via the printer operation device 140. When the instruction is input (S302: YES), the printer controller 110 at S303 determines whether the input instruction indicates that the WLAN communication is enabled or disabled. When the instruction indicates that the WLAN communication is enabled, the printer controller 110 at S306 sets the printer communication device 160 to the state in which the WLAN communication is enabled. When the instruction indicates that the WLAN communication is disabled, the printer controller 110 at S308 sets the printer communication device 160 to the state in which the WLAN communication is disabled. The WLAN is one example of a second communication standard, and processings for setting enabling and disabling of the WLAN communication in the printer communication device 160 (S306 and S308) are one example of a third communication setting processing.

Second Embodiment

Figure 9:
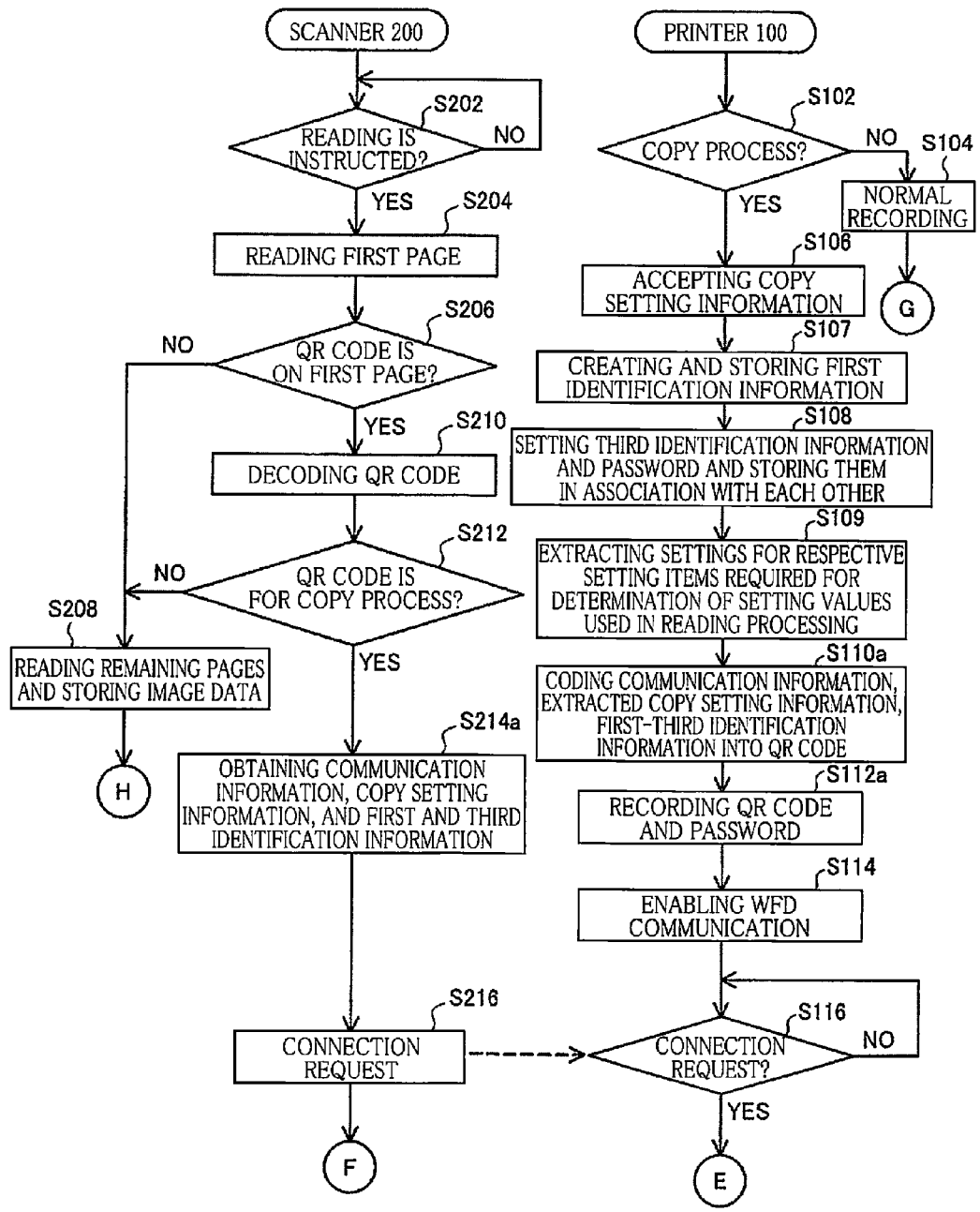
FIG. 9 is a flow chart illustrating a copy process executed by the copy system according to the second embodiment.
Figure 10:
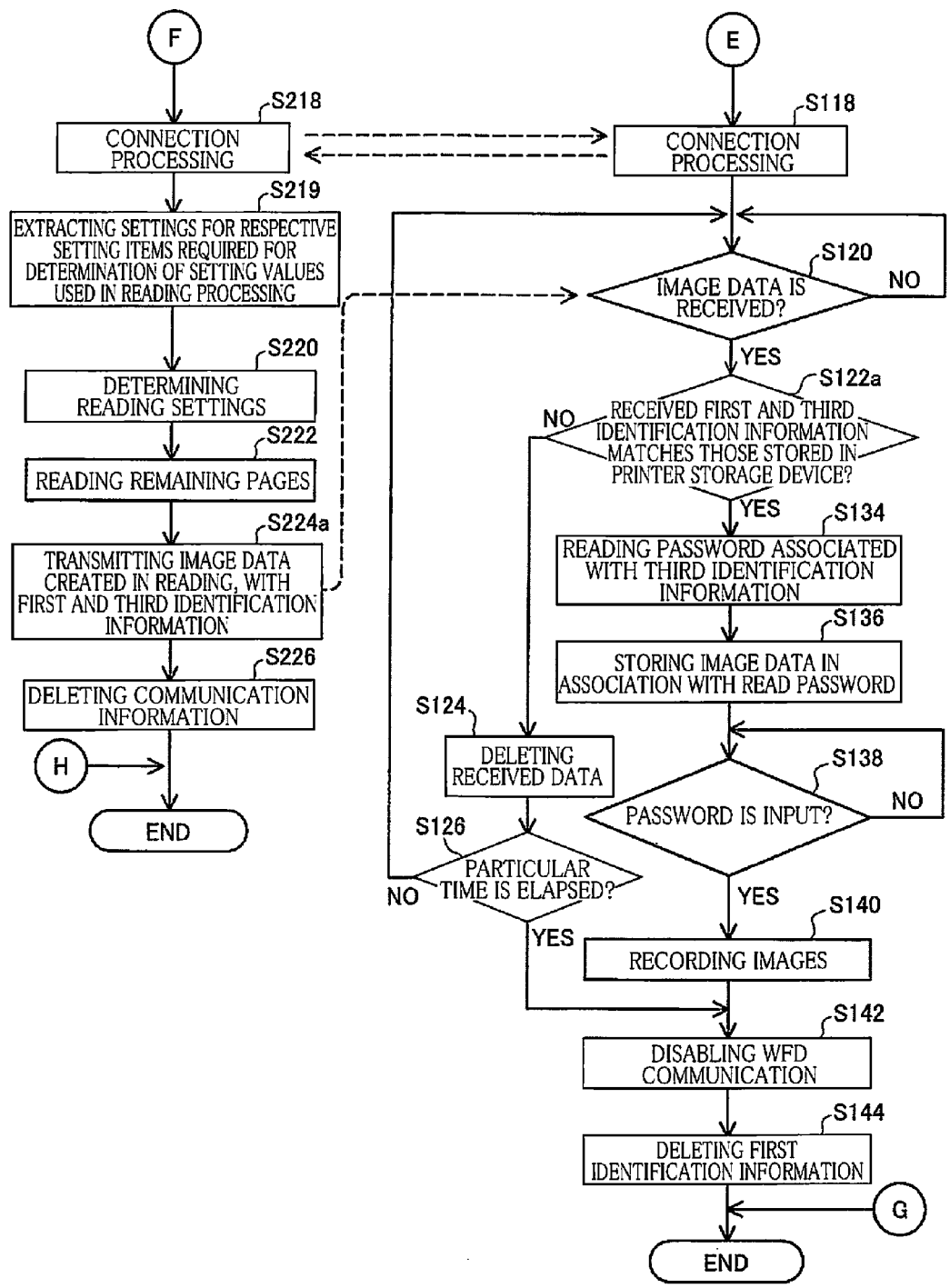
FIG. 10 is another flow chart illustrating the copy process executed by the copy system according to the second embodiment.

FIGS. 9 and 10 illustrate a flow of a copy process executed by a copy system 10 according to the second embodiment. The copy process in the second embodiment differs from that in the first embodiment in that the recording processing is started after a password is input to the printer operation device 140 of the printer 100, that is, what is called secure recording is performed, and in that the printer controller 110 extracts setting information indicating settings for setting items required for the scanner 200 to determine the reading settings, from the copy setting information accepted by the printer operation device 140 and incorporates the extracted setting information into the QR code. The secure recording can prevent a person different from the user having instructed the copy process, from taking away the copy produced by the printer 100, without permission, resulting in improved information security. Since the other processings in the copy process in the second embodiment are the same as those in the copy process in the first embodiment, the same step numbers as used in the first embodiment are used to designate the corresponding processings in the second embodiment, and an explanation of which is dispensed with.

Figure 11:
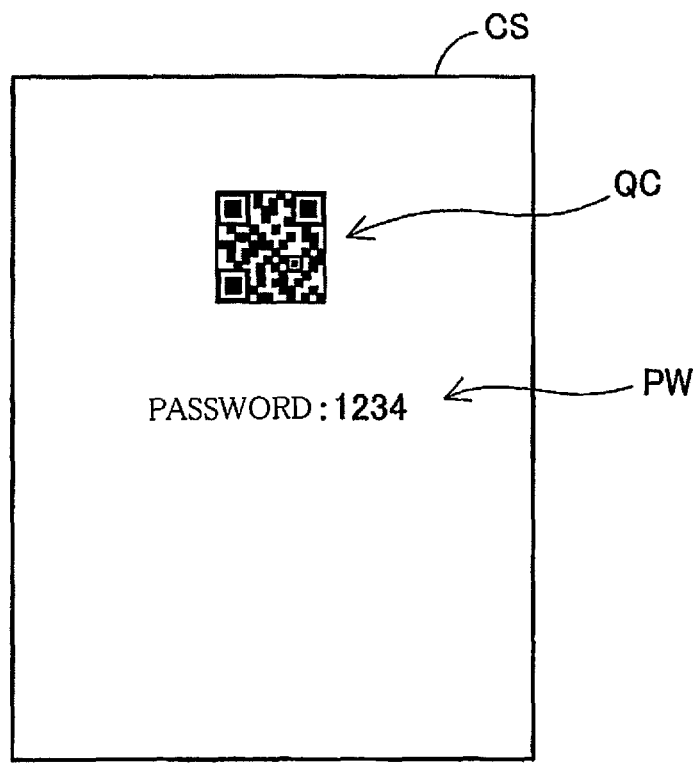
FIG. 11 is a view for explaining one example of a code recorded sheet CS in the second embodiment.

In the copy process in the second embodiment, as illustrated in FIG. 9, the printer controller 110 not only at S107 executes the identification-information storing processing for storing the first and second identification information to the printer storage device 114 but also at S108 executes a password storing processing for setting third identification information and a password and storing the third identification information and the password into the printer storage device 114 in a state in which the third identification information and the password are associated with each other. The third identification information is a character string created according to a predetermined algorithm. The printer controller 110 at S109 extracts, from the settings for the copy setting items accepted at S106, the settings for the respective setting items required for determination of the setting values used in the reading processing. In a coding processing at S110a, the printer controller 110 codes (i) the communication information, (ii) extracted copy setting information as the extracted settings, (iii) the first and second identification information, and (iv) the third identification information, into a QR code. In a code recording processing at S112a, the printer controller 110 records the QR code and the password on the sheet such that the user can recognize the password. FIG. 11 illustrates one example of the code recorded sheet CS created in this manner. As illustrated in FIG. 11, the QR code (QC) and the password (PW) are recorded on the code recorded sheet CS. The password is not coded and described in the form of characters and signs, allowing the user to identify the password.

Also, as illustrated in FIG. 9, in an information obtaining processing for obtaining information from the QR code at S214a, the scanner controller 210 obtains the communication information, the copy setting information, the first identification information, and the third identification information. It is noted that the user recognizes the password by viewing the code recorded sheet CS. As illustrated in FIG. 10, in a transmission processing for transmitting data to the printer communication device 160 at S224a, the scanner controller 210 transmits the image data, the first identification information, and the third identification information.

In a first match-determination processing at S122a for determining whether the first identification information received with the image data matches the first identification information stored in the printer storage device 114, the printer controller 110 also executes a second match-determination processing for determining whether the third identification information received with the image data matches the third identification information stored in the printer storage device 114. When the first identification information received with the image data matches the first identification information stored in the printer storage device 114, and the third identification information received with the image data matches the third identification information stored in the printer storage device 114 (S122a: YES), the printer controller 110 at S134 reads the password associated with the third identification information from the printer storage device 114. The printer controller 110 at S136 stores image data into the printer storage device 114 in a state in which the image data and the read password are associated with each other.

The printer controller 110 at S138 executes a password determination processing for determining whether the password is input to the printer operation device 140. When the password is input to the printer operation device 140 (S138:

YES), the printer controller 110 at S140 executes the recording processing for recording images based on the image data stored in association with the input password. As a result, the copy of the original documents OD is printed.

In the copy process in the second embodiment as described above, the copy system 10 can obtain the same effects as obtained in the copy process of the first embodiment and can perform what is called secure recording, resulting in improved information security in the copy process.

Modifications

While the embodiments have been described above, it is to be understood that the disclosure is not limited to the details of the illustrated embodiments, but may be embodied with various changes and modifications, which may occur to those skilled in the art, without departing from the spirit and scope of the disclosure.

The above-described configuration of the copy system 10 is merely one example and may be modified. For example, while the printer 100 is capable of communicating with external devices over the wired LAN and the WLAN in the above-described embodiments, the printer 100 may not be capable of performing such communication. The above-described configuration of each of the printer 100 and the scanner 200 is merely one example and may be modified.

In the above-described embodiments, the printer communication device 160 of the printer 100 executes normal communications according to the WLAN communication standard and the wired-LAN communication standard and executes the temporary communication for the copy process according to the WFD communication standard. However, the present disclosure is not limited to this configuration. For example, the printer communication device 160 may execute the normal communications according to a communication standard different from the WLAN standard (e.g., the wired-LAN or WFD standard) and execute the temporary communication for the copy process according to a communication standard different from the WFD standard (e.g., the WLAN or wired-LAN standard). The printer communication device 160 may execute the normal communications and the temporary communication for the copy process according to the same communication standard. For example, the printer communication device 160 may execute the normal communications and the temporary communication for the copy process according to any of the WFD communication standard and the WLAN communication standard. In these cases, the normal communications and the temporary communication for the copy process may be distinguished from each other by using different SSIDs for the WFD communication or using different device names in the WLAN communication. The communication for the copy process by the printer communication device 160 does not always need to be the temporary communication and may be the normal communications. The printer communication device 160 may be capable of executing only the temporary communication for the copy process.

In the above-described embodiments, the scanner controller 210 uses the second identification information to identify whether the QR code contained in the image data is the QR code created and recorded for the copy process. However, the present disclosure is not limited to this configuration. For example, the scanner controller 210 may determine whether information contained in the QR code matches a particular form to identify the QR code is the QR code created and recorded for the copy process. This configuration can be achieved as follows. For example, in the QR code containing particular information elements (e.g., the communication information and the first identification information), information (e.g., a character string of the name of each set of particular information) for identifying each particular information element is provided at the beginning of each particular information element (e.g., the communication information and the first identification information). In analyzing the QR code, the scanner controller 210 determines whether the information for identifying each particular information element is present. When all the pieces of information for identifying the respective particular information elements are present, the scanner controller 210 determines that the QR code matches the particular form. It is noted that the printer 100 does not need to incorporate the second identification information into the QR code in this case.

The QR code contains the first identification information and the copy setting information in the printer 100 in the above-described embodiment, but the QR code only at least needs to contain the communication information and may not contain the first identification information and the copy setting information. Also, while the QR code is used as the particular code in the above-described embodiments, another type of code may be used such as two-dimensional codes other than the QR code, e.g., a bar code. Also, a single piece of information may be used as both of the first identification information and the third identification information in the second embodiment.

The code-presence determination processing is executed only for the first page of the reading documents RD in the above-described embodiments but may be executed for another page or other pages. In this configuration, when the scanner controller 210 executes the code-presence determination processing for a particular page and determines that the particular page contains the QR code for the copy process, the scanner controller 210 may not execute the code-presence determination processing for pages to be read after the particular page among the reading documents RD.

In the above-described embodiments, the scanner controller 210 selects, as the reading settings used when the reading device 230 reads the original documents OD, the reading settings with the lowest load among the reading settings that satisfy the settings, identified by the copy setting information, for the recording processing in the recording device 130. However, the present disclosure is not limited to this configuration. For example, the scanner controller 210 may select any of the reading settings that satisfy the settings, identified by the copy setting information, for the recording processing in the recording device 130. The scanner controller 210 may determine the reading settings not based on the copy setting information. For example, the scanner controller 210 may determine the reading settings by selecting default reading settings.

In the above-described embodiment, the printer controller 110 at S106 accepts the settings for the respective copy setting items via, e.g., the printer operation device 140. However, the printer controller 110 may at S106 obtain default settings for the respective copy setting items which are stored in the printer storage device 114.

In the copy process in the above-described embodiments, the reading documents RD are constituted by the code recorded sheet CS and the original documents OD for which the copy process is to be executed. However, the reading documents RD may contain a document (page) or documents (pages) other than the original documents OD. The steps associated with the copy process in the above-described embodiments may vary. Steps may be added, removed, altered, combined, and reordered without departing from the spirit and scope of the disclosure.

What is claimed is:

1. A copy system, comprising:
an image recording apparatus; and
a reading apparatus,
the image recording apparatus comprising:
a printing device;
a recording-apparatus communication interface configured to communicate with an external device; and
a recording-apparatus controller configured to control the image recording apparatus,
the reading apparatus comprising:
a reader configured to read at least one document;
a reading-apparatus communication interface configured to communicate with an external device; and
a reading-apparatus controller configured to control the reading apparatus,
the recording-apparatus controller being configured to perform:
controlling the printing device to record a particular code indicating communication information identifying the recording-apparatus communication interface;
receiving image data via the recording-apparatus communication interface; and
controlling the printing device to record at least one image based on the received image data,
the reading-apparatus controller being configured to perform:
controlling the reader to read at least one document to create image data; and
analyzing the created image data and determining whether the created image data contains the particular code in units of pages of the at least one document,
the reading-apparatus controller being configured to, when determining that the created image data contains the particular code, perform:
obtaining the communication information indicated by the particular code, based on the created image data; and
transmitting particular image data of the created image data to a destination identified by the communication information via the reading-apparatus communication interface, the particular image data corresponding to a portion of the created image data,
wherein the image recording apparatus further comprises recording-apparatus storage,
wherein the recording-apparatus controller is configured to perform:
storing first identification information into the recording-apparatus storage;
controlling the printing device to record the particular code indicating the first identification information, in addition to the communication information;
receiving the first identification information in addition to the particular image data via the recording-apparatus communication interface;
determining whether the received first identification information matches the first identification information stored in the recording-apparatus storage; and
when determining that the received first identification information matches the first identification information stored in the recording-apparatus storage, controlling the printing device to record at least one image based on the particular image data received from the reading-apparatus controller,
wherein the reading-apparatus controller is configured to perform:
obtaining the first identification information based on the created image data in addition to the communication information; and
transmitting the first identification information in addition to the particular image data.

2. The copy system according to claim 1,
wherein the particular image data corresponds to at least one page among the at least one document, and
wherein the at least one page is read after a page containing the particular code by the reader in creation of the image data.

3. The copy system according to claim 2,
wherein the reading apparatus further comprises a document conveyor configured to convey the at least one document one by one to the reader in units of pages, and
wherein when determining that the created image data contains the particular code, the reading-apparatus controller is configured not to determine whether the created image data contains the particular code, for the at least one page that is read after the page containing the particular code by the reader in creation of the image data among the at least one document.

4. The copy system according to claim 1, wherein the recording-apparatus controller is configured to delete the first identification information from the recording-apparatus storage when determining that the received first identification information matches the first identification information stored in the recording-apparatus storage.

5. The copy system according to claim 1,
wherein the recording-apparatus communication interface is configured to perform communication according to at least a first communication standard, and
wherein the recording-apparatus controller is configured to perform:
controlling the printing device to record the particular code indicating the communication information about the first communication standard in the recording-apparatus communication interface;
setting the recording-apparatus communication interface to a state in which communication based on at least the communication information according to the first communication standard is enabled, in a first communication setting processing; and
setting the recording-apparatus communication interface to a state in which communication based on at least the communication information according to the first communication standard is disabled, in a second communication setting processing, when determining that the received first identification information matches the first identification information stored in the recording-apparatus storage.

6. The copy system according to claim 5,
wherein the image recording apparatus further comprises a recording-apparatus operation device,
wherein the recording-apparatus communication interface is configured to perform communication selectively according to one of the first communication standard and a second communication standard different from the first communication standard, and
wherein the recording-apparatus controller is configured to, in response to reception of an input from the recording-apparatus operation device, set whether communication of the recording-apparatus communication interface according to the second communication standard is enabled.

7. The copy system according to claim 5, wherein the recording-apparatus controller is configured to execute the second communication setting processing when determining that the received first identification information matches the first identification information stored in the recording-apparatus storage or when a particular length of time has passed from completion of the first communication setting processing.

8. The copy system according to claim 1,
wherein the reading apparatus further comprises a reading-apparatus storage, and
wherein the reading-apparatus controller is configured to perform:
storing the communication information obtained based on the created image data, into the reading-apparatus storage; and
deleting the communication information from the reading-apparatus storage after the particular image data is transmitted.

9. The copy system according to claim 1, wherein the reading-apparatus controller is configured to perform:
determining whether information contained in the particular code matches a particular form, when determining that the created image data contains the particular code; and
obtaining the communication information indicated by the particular code based on the created image data, when determining that the information contained in the particular code matches the particular form.

10. The copy system according to claim 1,
wherein the recording-apparatus controller is configured to control the printing device to record the particular code indicating copy setting information in addition to the communication information, and the copy setting information indicates a setting for a copy process to be executed by the reading apparatus and the image recording apparatus, and
wherein the reading-apparatus controller is configured to perform:
obtaining the copy setting information in addition to the communication information; and
controlling the reader to read at least one page different from a page containing the particular code among the at least one document, at a reading setting satisfying the copy setting information.

11. The copy system according to claim 1,
wherein the reading apparatus further comprises a document conveyor configured to convey the at least one document one by one to the reader in units of pages,
wherein the reading-apparatus controller is configured to determine whether the created image data contains the particular code, for a page which is conveyed first by the reader among the at least one document, and
wherein the reading-apparatus controller is configured not to determine whether the created image data contains the particular code, for the other pages among the at least one document.

12. The copy system according to claim 1,
wherein the image recording apparatus further comprises:
a recording-apparatus storage; and
a recording-apparatus operation device,
wherein the recording-apparatus controller is configured to perform:
storing specific identification information and a password into the recording-apparatus storage in a state in which the specific identification information and the password are associated with each other;
controlling the printing device to record the particular code indicating the specific identification information stored in the recording-apparatus storage in addition to the communication information, and to record the password associated with the specific identification information stored in the recording-apparatus storage, in a manner in which the password is identifiable by a user;
receiving the specific identification information in addition to the particular image data via the recording-apparatus communication interface;
determining whether the received specific identification information matches the specific identification information stored in the recording-apparatus storage;
storing the received particular image data into the recording-apparatus storage when determining that the received specific identification information matches the specific identification information stored in the recording-apparatus storage;
determining whether an input indicating the password associated with the received specific identification information is accepted via the recording-apparatus operation device; and
controlling the printing device to record at least one image based on the received particular image data when determining that the input indicating the password is accepted,
wherein the reading-apparatus controller is configured to perform:
obtaining the specific identification information in addition to the communication information, based on the created image data; and
transmitting the specific identification information in addition to the particular image data.

13. The copy system according to claim 1, wherein transmission and reception of the image data are performed over wireless communication.

14. The copy system according to claim 13, wherein the communication information comprises a service set identifier in the wireless communication according to a Wi-Fi Direct standard.

15. A copy system, comprising:
an image recording apparatus; and
a reading apparatus,
the image recording apparatus comprising:
a printing device;
a recording-apparatus communication interface configured to communicate with an external device; and
a recording-apparatus controller configured to control the image recording apparatus,
the reading apparatus comprising:
a reader configured to read at least one document;
a reading-apparatus communication interface configured to communicate with an external device; and
a reading-apparatus controller configured to control the reading apparatus,
the recording-apparatus controller being configured to perform:
controlling the printing device to record a particular code indicating communication information identifying the recording-apparatus communication interface;
receiving image data via the recording-apparatus communication interface; and
controlling the printing device to record at least one image based on the received image data,
the reading-apparatus controller being configured to perform:
controlling the reader to read at least one document to create image data; and analyzing the created image data and determining whether the created image data contains the particular code in units of pages of the at least one document, the reading-apparatus controller being configured to, when determining that the created image data contains the particular code, perform:

obtaining the communication information indicated by the particular code, based on the created image data; and transmitting particular image data of the created image data to a destination identified by the communication information via the reading-apparatus communication interface, the particular image data corresponding to a portion of the created image data, wherein the recording-apparatus controller is configured to control the printing device to record the particular code indicating particular identification information, in addition to the communication information, and wherein the reading-apparatus controller is configured to perform:

determining whether the particular code contains the particular identification information, when determining that the created image data contains the particular code; and obtaining the communication information indicated by the particular code based on the created image data, when determining that the particular code contains the particular identification information.

16. A reading apparatus, comprising:

a reader configured to read at least one document;

a reading-apparatus communication interface configured to communicate with an image recording apparatus; and a reading-apparatus controller configured to perform:

controlling the reader to read at least one document to create image data; and analyzing the created image data and determining whether the created image data contains a particular code recorded by the image recording apparatus, in units of pages of the at least one document, the reading-apparatus controller being configured to, when determining that the created image data contains the particular code, perform:

obtaining (i) communication information indicating the particular code contained in the image data and (ii) copy setting information indicating a particular setting for an item related to a copy process to be executed by the reading apparatus and the image recording apparatus; and determining a reading setting for creation of the image data based on the copy setting information, the reading-apparatus controller being configured to, when determining that the created image data contains the particular code, perform:

controlling the reader to read, at the determined reading setting, at least one page different from a page containing the particular code among the at least one document; and transmitting particular image data of the created image data to a destination identified by the communication information via the reading-apparatus communication interface, the particular image data corresponding to a portion of the created image data and containing image data representative of the read at least one page, wherein the reading-apparatus controller is configured to perform:

obtaining first identification information indicated by the particular code that is recorded by the image recording apparatus and that indicates the communication information identifying the image recording apparatus; and transmitting the obtained first identification information and the particular image data to the image recording apparatus identified by the communication information indicated by the particular code that is recorded by the image recording apparatus and that indicates the obtained first identification information, and wherein the reading-apparatus controller is configured to determine, as the reading setting, a reading setting with a least load among reading settings satisfying the particular setting, indicated by the copy setting information, for the item related to the copy process.

17. An image recording apparatus, comprising:

a printing device;

a recording-apparatus communication interface configured to communicate with a reading apparatus;

a recording-apparatus operation device; and a recording-apparatus controller configured to perform:

accepting, from the recording-apparatus operation device, settings for a plurality of setting items related to a copy process to be executed by the reading apparatus and the image recording apparatus;

extracting, from the received settings for the plurality of setting items, a setting for a setting item required for determination of a reading setting in a reading processing;

controlling the printing device to record a particular code indicating (i) communication information identifying the recording-apparatus communication interface and (ii) extracted copy setting information indicating the extracted setting;

receiving image data via the recording-apparatus communication interface; and controlling the printing device to record at least one image based on the received image data at the accepted settings for the plurality of setting items, wherein the image recording apparatus further comprises a recording-apparatus storage, and wherein the recording-apparatus controller is configured to perform:

storing first identification information into the recording-apparatus storage;

controlling the printing device to record the particular code indicating the first identification information, in addition to the communication information and the extracted copy setting information;

receiving the first identification information from the reading apparatus in addition to the image data via the recording-apparatus communication interface;

determining whether the received first identification information matches the first identification information stored in the recording-apparatus storage; and when determining that the received first identification information matches the first identification information stored in the recording-apparatus storage, controlling the printing device to record at least one image based on the received image data.

* * * * *